Oct. 6, 1964

A. KADDEN 3,151,848

SEDIMENTATION TANKS

Filed April 30, 1962

INVENTOR:
ALFRED KADDEN
BY Theodore M. Jablon
ATTORNEY

United States Patent Office 3,151,848
Patented Oct. 6, 1964

3,151,848
SEDIMENTATION TANKS
Alfred Kadden, New York, N.Y., assignor to Dorr-Oliver Incorporated, Stamford, Conn., a corporation of Delaware
Filed Apr. 30, 1962, Ser. No. 191,178
7 Claims. (Cl. 259—151)

This invention relates to improvements in apparatus for blending and storage of slurries, for example, cement slurry which must be kept agitated and mixed while stored.

In the class of apparatus herein contemplated the slurry is continuously agitated by means of compressed air introduced into the slurry mixture at the bottom of the tank, for maintaining the slurry as a homogenous mixture such as is required, for example, by the wet process method in the manufacture of Portland cement.

Usually, the required mixing air is introduced into the slurry content of the tank by means of air dispersing nozzles carried by an agitating structure rotated about the vertical center axis of the tank.

An example of an apparatus arrangement suited for such continuous agitation of cement slurries is shown and described in U.S. Patent 1,832,469 to W. A. Neill, et al. Briefly, this mixing-storage tank has an overhead truss spanning the top of the tank, which carries suspended therefrom a drive shaft and also has mounted thereon the driving mechanism therefor, while providing access to this mechanism. The lower end of the shaft has radially extending rake arms carrying the air dispersing nozzles, and is provided with agitating raking blades or the like. Air is supplied to the nozzles through a suitable piping system mounted on the rotary structure, which piping system, through a common header and a suitable rotary joint, communicates with a stationary air supply pipe located on the truss.

However, as the cement industry has grown, there has been a demand for ever larger tanks. Yet, as the diameter of the tank increases, so must the size of the aforementioned truss increase, with the result that the truss becomes disproportionately long and heavy and expensive. Furthermore, since the weight of the truss is supported on the tank walls, larger and therefore more expensive walls must be provided for sustaining the increased weight of this larger truss.

The U.S. patent to Coulter, 2,458,061, in FIG. 18 thereof avoids this problem of the large diametrically extending rake supporting truss, by the provision of a center pier in the tank, upon which the central cage portion of a slurry engaging and nozzle carrying rotary rake structure is operatively supported. A powered drive mechanism is mounted atop the pier for rotating the rake structure which has an annular bearing means between the cage portion and the pier.

The shortcoming of this arrangement, however, lies in the fact that a desirably short truss structure extending radially only between the tank wall and the center pier to provide access, cannot be constructed under these conditions for the reason that supporting it upon the top of the center pier would interfere with the rotation of the air pipe system carried by and rotating with the rake structure about the pier.

However, this invention avoids and solves all the foregoing problems by providing supporting means effective between the inner end of a stationary radial truss structure and the pier, that will not interfere with the rotation of the rake structure and of the air pipe system carried thereby.

In solving this problem, this invention provides auxiliary annular bearing means carried by the center cage of the rake structure, and concentric with the aforementioned annular bearing means on the pier, which auxiliary annular bearing means furnish support for the inner end of the truss, with the rotating air pipe system on the rake structure non-interferingly extending through the central opening provided by the auxiliary annular bearing means.

Preferably, an upward extension of the central cage portion of the rake structure provides a mounting means or platform for the auxiliary bearing means, with the rotating air pipe system correspondingly shaped and extending through said central opening for connection through the rotary joint with the stationary air supply located on the stationary truss structure thus supported.

Other features and advantages of the invention will appear from the following description taken in conjunction with the accompanying drawings wherein.

Figure 1:
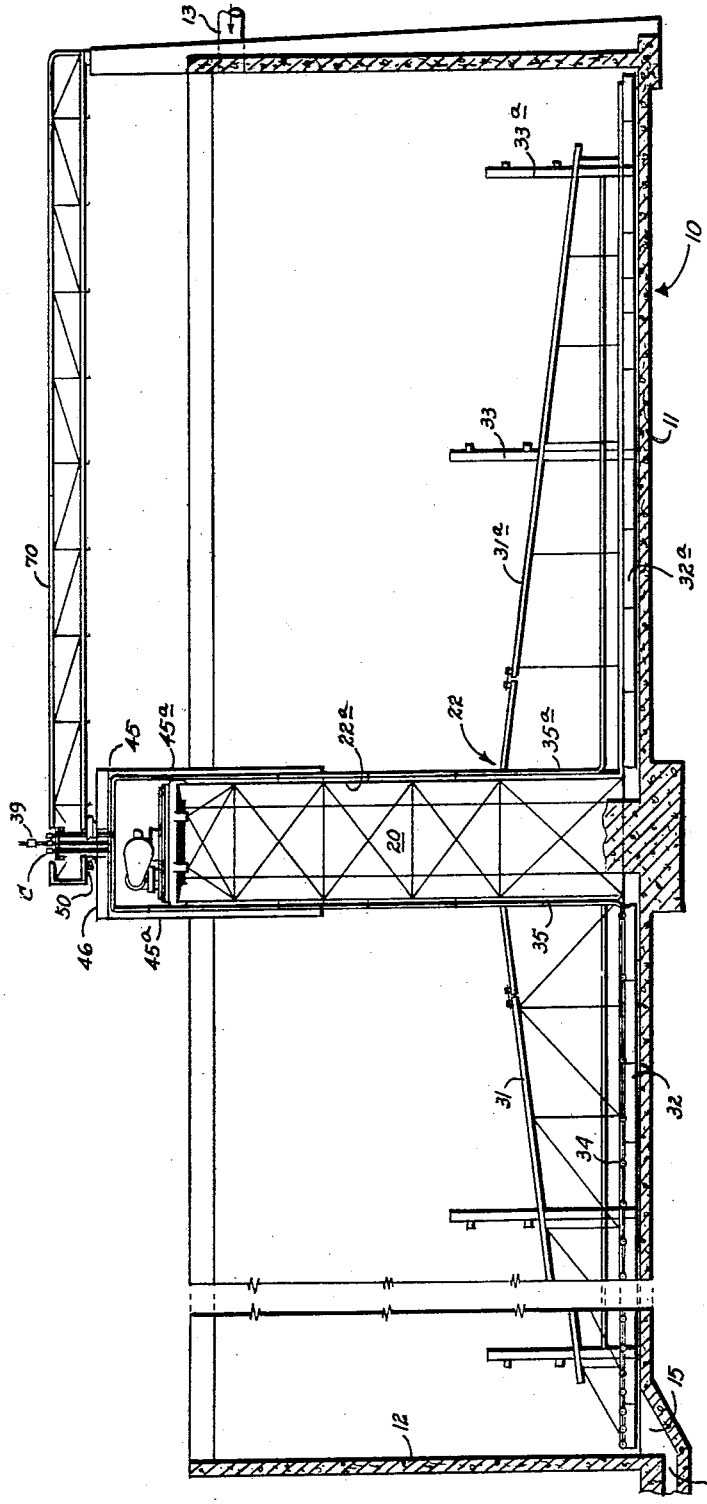
FIG. 1 is a center pier type slurry mixing tank embodying the invention, including the auxiliary annular bearing means for the truss.
Figure 2:
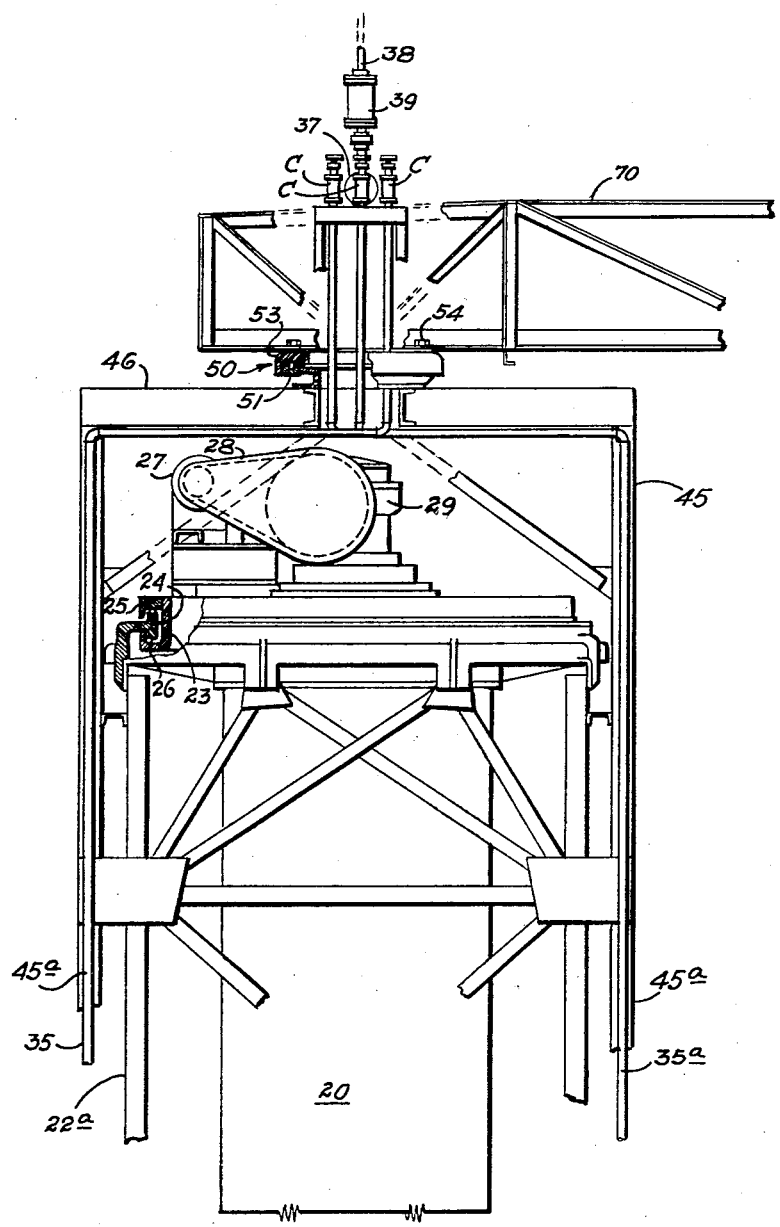
FIG. 2 is an enlarged side view taken from FIG. 1, illustrating more clearly the arrangement of the auxiliary bearing means relative to the truss, the rake structure, and the air pipe system on the rake structure.

Referring to the drawings and particularly to FIGS. 1 and 2 illustrating a preferred embodiment of this invention, there is provided a tank having a bottom 11 and a peripheral wall 12, adapted for containing a mixture, for example, cement slurry to be held in storage and from which periodically quantities may be withdrawn. The tank has a feed supply pipe 13 through which the slurry to be blended and/or stored is fed into the tank. A draw-off pipe 14 is used for discharging slurry from the tank in the quantities required. As shown in FIG. 1, the draw-off pipe may discharge the slurry from a drain area or sump 15 located at the margin of the tank.

Slurry may be fed into the tank until it reaches a maximum level, while additional slurry being fed beyond that maximum is removed as by an overflow pipe not shown.

A stationary center pier 20 rises from the tank bottom operatively supporting a slurry engaging structure 22 herein also simply termed the rake structure which has a central cage portion 22a surrounding the pier, and slurry engaging rake arms extending from the lower end of this cage portion, with raking or agitating blades provided on the rake arms adjacent to the bottom of the tank.

The rotary mounting of the rake structure relative to the pier may be of a conventional construction, including a stationary supporting frame construction 23 mounted upon the top end of the pier, and an internal bull gear 24 connected to the top end of the cage portion of the rake structure and rotatably mounted on the frame construction 23 by means of top and bottom roller bearings 25 and 26 respectively.

Rotation of the rake structure is effected by a drive mechanism which also may be of conventional construction, comprising a motor 27 connected to a chain drive 28 which in turn transmits the driving power through a speed reducing gear mechanism 29 to bull gear 24 and thus to the rake structure 22.

The rake structure 22 in this embodiment more particularly comprises a pair of diametrically opposed radially extending rake arms 31 and 31a extending from the lower end of the center cage 22a adjacent to the tank bottom 11, and shown to be provided with sediment engaging agitating blades 32 and 32a.

Moreover, the rake arms for the slurry mixers carry conventional air lift tubes 33 and 33a respectively mounted on the respective rake arms for lifting slurry from the tank bottom to the upper portion of the tank contents, and they also carry respectively the dispersion nozzles shown only at 34 on arm 31 for agitating the slurry in the bottom zone.

The compressed air for the air lifts and for the dispersion nozzles is supplied through air piping or fluid conduit means indicated, for example, by the pipes 35 and 35a leading to the respective sets of nozzles on the respective arms 31 and 31a, and pipes 36 and 36a which lead to the respective air lifts 33 and 33a on the respective arms. Each of the pipes 35, 35a and 36, 36a of the system has a suitable control valve C which may be manually operable, connected through a distributor head 37 to a stationary air supply pipe 38 by way of a rotary joint 39.

Figure 4:
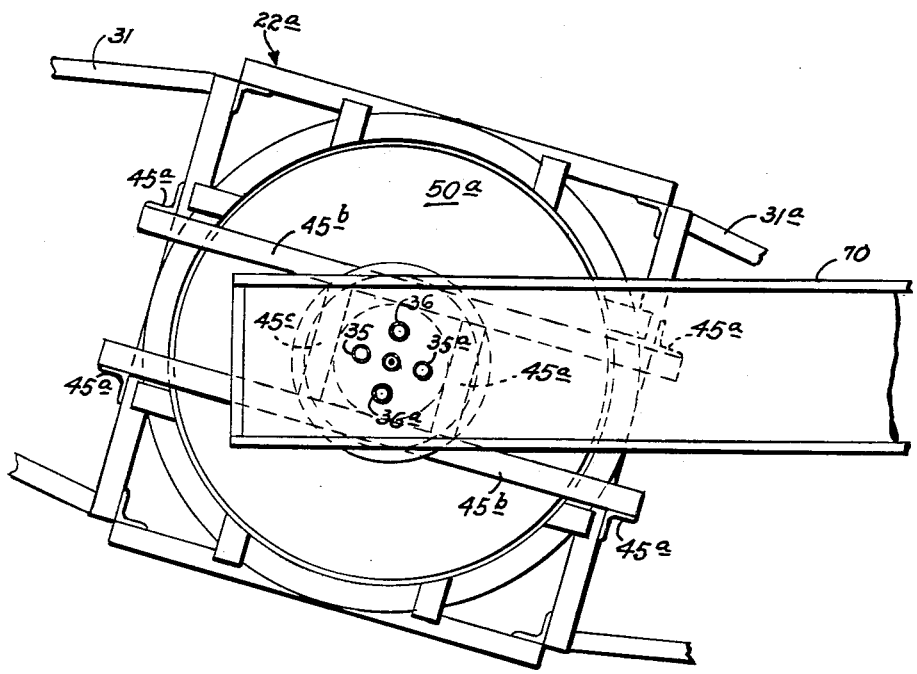
FIG. 4 is a plan view of the arrangement shown in FIG. 3.

Insofar as the present invention is concerned, there is provided in this embodiment an extension structure 45 rising from the top end of the center cage 22a of the rake structure to a level over and above the drive mechanism, and thus in effect providing on the rotating center cage 22a an upwardly spaced auxiliary platform 46 rotating with the rake structure. Preferably, this extension structure 45 comprises vertical support members 45a (see FIGS. 2 and 4) which in the view of FIG. 2 appear as upward extensions of the center cage 22a furthermore transverse support members 45b rigidly connected to respective vertical support members 45a clearing the drive mechanism on the pier, and further horizontal cross-bar members 45c which in turn are suitably secured to the horizontal transverse members 45b (see FIG. 4).

Mounted upon the platform structure 46, and more particularly upon the transverse members 45b and cross-bar members 45c, is an annular thrust bearing constrution 50 especially provided according to the invention for supporting the walkway structure or radial truss 70 relative to the pier.

Figure 3:
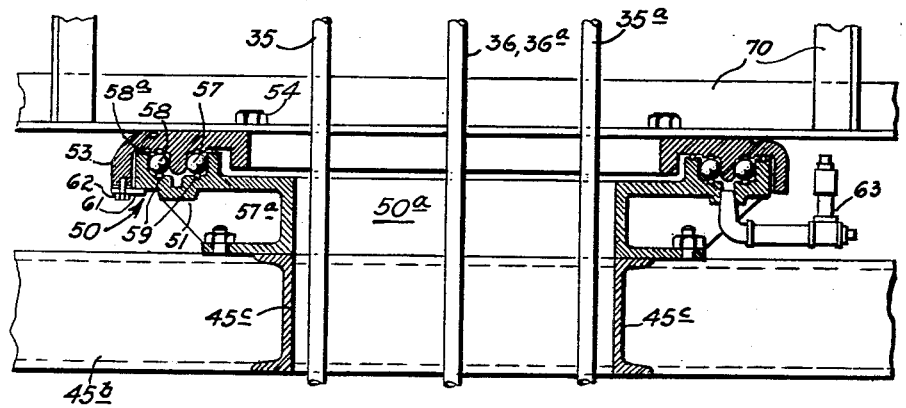
FIG. 3 is a further enlarged detail sectional view of the auxiliary bearing means and the respective parts cooperating therewith.

As illustrated in FIG. 3, the annular thrust bearing construction 50 comprises an annular turntable base 51 suitably secured or bolted to the supporting members 45b and 45c, as well as an annular turntable top 53 secured to the underside of the inner end of the aforementioned walkway truss, as indicated by bolt connections 54. The turntable top 53 is separated from the turntable base 51 preferably by two concentric rows of ball bearings, namely an inner row 57 in a respective ball race 57a and an outer row 58 in a respective ball race 58a. Preferably, these ball races are provided with replaceable strip liners 59 providing annular hardened wearing surfaces for the balls which may be contained in conventional annular ball retainers or cages.

The turntable top 53 has a retainer 61 removably secured to the underside thereof as indicated by screws 62, while the turntable base 51 has means for supplying a lubricant to the ball bearings indicated by an oil drain and fill arrangement 63. It is to be noted that the bearing construction 50 defines a central passage opening 50a through which, according to the invention, the aforementioned air piping system 35, 35a and 36, 36a extends to communicate with the stationary air supply pipe 38 by way of the aforementioned rotary joint 39.

In the operation of the invention, as the rake structure 22 is rotated by the drive mechanism on the pier, the extension structure 45 being unitary with and securely fastened to the center cage portion 22a, will cause the turntable base 51 to rotate therewith, inasmuch as this turntable base is securely bolted to the extension structure 45. The turntable top 53, however, being fixed to the underside of the walkway truss 70, will remain stationary with the truss, since it is separated from the rotating base 51 by the aforementioned concentric rows of ball bearings 58 and 57.

It will thus be seen that the present invention solves the problem of providing an economical walkway truss construction for large slurry mixing and storage tanks or the like, by a novel sturctural organization wherein the air pipe system or fluid conduit is unimpeded by the truss. Furthermore, while this invention has been described in connection with slurry mixers, it is also applicable to other apparatus wherein it is desirable to have a stationary structure supported at the center of the tank yet without direct connection to the pier.

Since this invention may be embodied in several forms without departing from the spirit or essential characteristics thereof, the present embodiment is, therefore, illustrative and not restrictive since the scope of the invention is defined by the appended claims rather than by the decription preceding it and all changes that fall within the metes and bounds of the claims or of forms that are functional as well as cojointly cooperative equivalent are, therefore, intended to be embraced by those claims.

I claim:

1. In a liquid treatment tank, the apparatus which comprises in combination a center pier rising from the tank bottom to a point above the level of the liquid in the tank, a rotary structure having a center cage portion surrounding said pier, an internal bull gear member rigidly connected to the upper end of said cage portion, annular first bearing means effective between said bull gear member and said pier for rotatably supporting the rotary structure on the pier, drive means including a drive unit mounted on said pier in driving engagement with said bull gear member, second vertical thrust bearing means concentric with said first bearing means and defining a central passage opening therein, structural means for mounting said second bearing means on said cage portion spaced above the upper end thereof, and constructed to extend upwardly from said cage portion and to revolve around said drive unit when said structure is being rotated thereby, and a radially extending structure having its inner end supported on said second bearing means and its outer end supported at the wall of the tank.

2. The apparatus according to claim 1, wherein said second bearing means comprise an annular turntable base, an annular turntable top member mounted over said turntable base, and ball bearing means separating said base from said turntable top member.

3. In a slurry treatment tank having slurry engaging means rotating about a vertical axis, the combination which comprises, a center pier rising from the tank bottom, a slurry engaging rake structure having a center cage portion surrounding the pier, annular first bearing means between said center cage portion and said pier for rotatably supporting the rake structure on the pier, a drive unit for rotating said structure mounted on top of said pier, second annular vertical thrust bearing means concentric with said first bearing means and defining a central passage opening, means for mounting said second bearing means on said cage portion, constructed in such a manner that said structural means extending upwardly from said cage portion revolve around said drive unit when said rake structure is rotated thereby, fluid conduit means extending through said passage opening and carried by said rotating slurry engaging structure to rotate therewith, and adapted to clear said drive unit during rotation of said rake structure, a radially extending structure having its inner end supported on said second annular thrust bearing means and its outer end supported at the wall of the tank, a stationary fluid supply conduit and rotary joint means between said stationary supply conduit and said fluid conduit means.

4. In a slurry treatment tank having slurry engaging means rotating about a vertical axis, the combination which comprises a center pier rising from the tank bottom, a slurry engaging structure having a cage portion surrounding the pier, annular first bearing means between said center cage portion and said pier for rotatably supporting the rake structure on the pier, a drive unit for rotating said structure mounted on top of said pier, second annular vertical thrust bearing means concentric with said first bearing means and defining a central passage opening, means for mounting said second bearing means on said cage portion, comprising vertical support elements rigidly secured to said cage portion, and transverse support elements supported by said vertical elements for supporting said second bearing means, fluid conduit means extending through said passage opening and carried by said rotating slurry engaging structure to rotate therewith, a radially extending structure having its inner end supported on said second annular thrust bearing means and its outer end supported at the wall of the tank, a stationary fluid supply conduit and rotary joint means between said stationary supply conduit and said fluid conduit means.

5. The arrangement according to claim 3, wherein said fluid conduit means comprise vertical pipe sections attached to said cage portion, horizontal pipe sections leading from the respective top ends of the vertical pipe sections to the lower side of said central opening in the second bearing means, and terminal vertical pipe sections extending from the end of said horizontal pipe sections upwardly through said opening.

6. In a liquid treatment tank the apparatus which comprises in combination a center pier rising from the tank bottom to a point above the level of the liquid in the tank, a rotary structure having a center cage portion surrounding said pier, an internal bull gear member rigidly connected to the upper end of said cage portion, annular first bearing means effective between said bull gear member and said pier for rotatably supporting the rotary structure thereon, drive means including a drive unit mounted on said pier, in driving engagement with said bull gear member, second vertical thrust bearing means concentric with said first bearing means and defining a central passage opening therein, structural means for mounting said second bearing means spaced upwardly from the upper end of said cage portion, and constructed so as to extend upwardly from said cage portion and to revolve around said drive unit when said structure is being rotated thereby, fluid conduit means extending through said passage opening and carried by said rotary structure, and a radially extending structure having its inner end supported on said second bearing means and its outer end supported at the wall of the tank.

7. The apparatus according to claim 6, wherein said mounting means comprise vertical support elements rigidly secured to said cage portion, and transverse support elements supported by said vertical elements for supporting said second bearing means.

References Cited in the file of this patent

UNITED STATES PATENTS

| | | |
|---|---|---|
| Re. 22,652 | Reybold et al. | June 26, 1945 |
| 2,236,434 | Knowles | Mar. 25, 1941 |
| 2,458,061 | Coulter | Jan. 4, 1949 |
| 2,553,958 | Chelminski et al. | May 22, 1951 |
| 2,881,922 | Kelly | Apr. 14, 1959 |
| 3,067,878 | Genter et al. | Dec. 11, 1962 |